United States Patent
Sugata

(10) Patent No.: US 11,330,449 B2
(45) Date of Patent: May 10, 2022

(54) COMMUNICATION SYSTEM, CONTROL METHOD, AND NON-TRANSITORY COMPUTER READABLE MEDIUM STORING CONTROL PROGRAM

(71) Applicant: TOYOTA JIDOSHA KABUSHIKI KAISHA, Toyota (JP)

(72) Inventor: Hikaru Sugata, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/148,692

(22) Filed: Jan. 14, 2021

(65) Prior Publication Data
US 2021/0258803 A1 Aug. 19, 2021

(30) Foreign Application Priority Data
Feb. 18, 2020 (JP) .............................. JP2020-024914

(51) Int. Cl.
*H04J 3/06* (2006.01)
*H04B 15/00* (2006.01)
*H04W 24/02* (2009.01)
*H04B 17/318* (2015.01)
*H04W 56/00* (2009.01)

(52) U.S. Cl.
CPC .......... *H04W 24/02* (2013.01); *H04B 17/318* (2015.01); *H04W 56/002* (2013.01)

(58) Field of Classification Search
CPC ... H04W 24/02; H04W 56/002; H04B 17/318
See application file for complete search history.

(56) References Cited

U.S. PATENT DOCUMENTS

| | | | |
|---|---|---|---|
| 2008/0307075 A1* | 12/2008 | Urano | G06F 1/14 709/220 |
| 2015/0346760 A1* | 12/2015 | Kishiro | H04J 3/0661 713/503 |
| 2016/0259032 A1* | 9/2016 | Hehn | G01S 5/0289 |
| 2017/0308853 A1 | 10/2017 | Tsuji et al. | |
| 2018/0284710 A1* | 10/2018 | Abe | G06F 16/217 |

FOREIGN PATENT DOCUMENTS

JP 5160818 B2 3/2013

* cited by examiner

*Primary Examiner* — Erika A Washington
(74) *Attorney, Agent, or Firm* — Oliff PLC

(57) ABSTRACT

A communication system includes a plurality of sensor terminals each having an individual time and a management terminal having a reference time. The management terminal associates the individual time with the reference time at which the individual time was received and stores the associated times as a time pair. The management terminal determines a communication delay time using the configuration information of the hardware of the sensor terminal, the version of the software of the sensor terminal, the configuration information of the hardware of the management terminal, the version of the software of the management terminal, and a communication delay-causing combination table. The management terminal corrects the correspondence relationship between the individual time and the reference time in accordance with the communication delay time and corrects information detection time received from each of the plurality of sensor terminals based on the corrected correspondence relationship.

6 Claims, 12 Drawing Sheets

| SENSOR TERMINAL | | MANAGEMENT TERMINAL | | COMMUNICATION DELAY TIME [ms] |
|---|---|---|---|---|
| VERSION OF HARDWARE | VERSION OF SOFTWARE | VERSION OF HARDWARE | VERSION OF SOFTWARE | |
| 1.0.0 | 1.0.0 | 2.0.0 | 2.0.1 | 60 |
| 1.0.0 | 2.0.0 | 2.0.0 | 2.1.0 | 42 |
| 1.1.0 | 1.0.0 | 2.0.0 | 2.0.1 | 58 |
| 1.1.0 | 2.0.0 | 1.0.1 | 1.1.0 | 65 |

Fig. 6

COMMUNICATION SYSTEM, CONTROL METHOD, AND NON-TRANSITORY COMPUTER READABLE MEDIUM STORING CONTROL PROGRAM

CROSS REFERENCE TO RELATED APPLICATIONS

This application is based upon and claims the benefit of priority from Japanese patent application No. 2020-024914, filed on Feb. 18, 2020, the disclosure of which is incorporated herein in its entirety by reference.

BACKGROUND

The present disclosure relates to a communication system, a control method, and a computer readable medium storing a control program.

A communication system for acquiring and analyzing a record of communication has been conventionally known. For example, Japanese Patent No. 5160818 discloses a communication system including a plurality of wearable type sensor terminals (terminals), a management terminal (a base station) that can perform data communication with these sensor terminals, and a relationship analysis unit (an application server) configured to calculate a relationship value among the users of the sensor terminals using sensing information obtained from the plurality of sensor terminals by the management terminal.

SUMMARY

In the communication system disclosed in Japanese Patent No. 5160818, each sensor terminal has a clock that indicates its individual time, and a time at which the sensing information was acquired (an information detection time) is recorded by this clock. The sensing information acquired by each sensor terminal and the corresponding information detection time are transmitted to the management terminal, and the management terminal compares the sensing information received from each of the sensor terminals with one another. When comparing the sensing information received from each of the sensor terminals with one another, the management terminal needs to correct the information detection time taking into consideration a lag between the individual time indicated by the clock of each sensor terminal and the reference time. However, a communication delay occurs when the management terminal receives the sensing information from each sensor terminal. Therefore, in order to enhance the accuracy in comparing the sensing information received from each of the sensor terminals with one another, it is desired to reduce the influence of these communication delays.

The present disclosure has been made in order to solve the problem mentioned above, and an object of the present disclosure is to provide a communication system capable of reducing an influence of a communication delay, a control method, and a computer readable medium storing a control program.

A communication system according to an exemplary aspect of the present disclosure includes:
  a plurality of sensor terminals each having a clock that indicates an individual time and configured to detect sensing information and an information detection time, the sensing information being related to a user and the information detection time being a time at which the sensing information was detected; and
  a management terminal configured to have a reference time and adapted to communicate with the plurality of the senor terminals,
    in which each of the plurality of the sensor terminals
    establishes a communication connection with the management terminal and then transmits the individual time, configuration information of the hardware of the sensor terminal, and a version of the software of the sensor terminal to the management terminal, and
    transmits the sensing information and the information detection time to the management terminal after transmitting the individual time to the management terminal,
    in which the management terminal
    associates the individual time received from each sensor terminal with the reference time at which the individual time was received and stores the associated times as a time pair,
    determines a communication delay time between each sensor terminal and the management terminal using the configuration information of the hardware of the sensor terminal, the version of the software of the sensor terminal, the configuration information of the hardware of the management terminal, the version of the software of the management terminal, and a communication delay-causing combination table, the communication delay-causing combination table indicating a communication delay time obtained by associating a combination of the configuration information of the hardware and the configuration information of the software of each sensor terminal with a combination of the configuration information of the hardware and the configuration information of the software of the management terminal,
    corrects the individual time of the time pair in accordance with the communication delay time and corrects a time correspondence map indicating a relationship between the individual time and the reference time using the corrected time pair, and
    corrects the information detection time received from each of the plurality of the sensor terminals based on the corrected time correspondence map.

A communication delay occurs when the management terminal receives the individual time from each sensor terminal. Therefore, the reference time at which the management terminal received the individual time from each sensor terminal is delayed from the reference time indicating the same instant as the individual time by the communication delay time. Therefore, the reference time corresponding to the individual time needs to be the time that is obtained by correcting the reference time at which the management terminal received the individual time from each sensor terminal taking into consideration the communication delay time. However, the communication delay time varies depending on the combination of the configuration information of the hardware of each sensor terminal, the version of the software of each sensor terminal, the configuration information of the hardware of the management terminal, and the version of the software of the management terminal. In the communication system according to the exemplary aspect of the present disclosure, the communication delay time is determined in accordance with the aforementioned combination, and a time correspondence map indicating a relationship between the individual time and the reference time is corrected using the communication delay time. Then, the information detection time received from each of the plurality of the sensor terminals is corrected based on the corrected time correspondence map. By this configuration, the influence of the communication delays can be reduced.

Further, the configuration information of the hardware of the sensor terminal is information related to specifications of structural components of the sensor terminal. Further, the configuration information of the hardware of the management terminal is information related to specifications of structural components of the management terminal. When a plurality of sensor terminals manufactured by only one manufacturer and a management terminal are used, the configuration information of the hardware of the sensor terminals and the configuration information of the hardware of the management terminal can be defined by the versions of the hardware. However, when a plurality of sensor terminals manufactured by a plurality of manufacturers and a management terminal are used, it is difficult to define the configuration information of the hardware of the sensor terminals and the configuration information of the hardware of the management terminal by the versions of the hardware. By setting the configuration information of the hardware of the plurality of the sensor terminals and the configuration information of the hardware of the management terminal to be information related to the specifications of the structural components of the sensor terminals and the specifications of the structural components of the management terminal, respectively, the configuration information of the hardware of the plurality of the sensor terminals and the configuration information of the hardware of the management terminal can be easily defined even when a plurality of sensor terminals manufactured by a plurality of manufacturers and a management terminal are used.

Furthermore, the information related to the specifications of the structural components includes a specification of at least one of a CPU, a memory, and a communication module. Further, among the structural components of the sensor terminals and the structural components of the management terminal, those that affect the communication delays include, for instance, a CPU, a memory, and a communication module. By setting the configuration information of the hardware of the sensor terminals and the configuration information of the hardware of the management terminal to be information related to the specification of at least one of the CPU, the memory, and the communication module, the configuration information of the hardware of the sensor terminals and the configuration information of the hardware of the management terminal can be easily defined even when a plurality of sensor terminals manufactured by a plurality of manufacturers and a management terminal are used.

Further, when the intensity of the radio waves emitted from each sensor terminal at the time when the management terminal received the individual time from the pertinent sensor terminal is below a prescribed threshold value, the management terminal may discard the received individual time. When the intensity of the radio waves emitted from each sensor terminal at the time when the management terminal received the individual time from the pertinent sensor terminal is below the prescribed threshold value, it is highly likely that the pertinent sensor terminal tried to re-transmit the individual time several times, and then finally, the management terminal received the individual time. The greater the number of re-transmission performed, the longer the communication delay time becomes. That is, when the intensity of the radio waves emitted from each sensor terminal is below the prescribed threshold value, it is highly likely that the actual communication delay time deviates from the determined communication delay time. Accordingly, when an intensity of radio waves emitted from the sensor terminal at the time when the management terminal received the individual time is below a prescribed threshold value, the management terminal discards the received individual time. By this configuration, it is possible to ensure accuracy of the communication delay time.

A control method according to an exemplary aspect of the present disclosure is a control method for a communication system that includes:

a plurality of sensor terminals each having a clock that indicates an individual time and configured to detect sensing information and an information detection time, the sensing information being related to a user and the information detection time being a time at which the sensing information was detected; and a management terminal configured to have a reference time and adapted to communicate with the plurality of the senor terminals, the method including:
establishing, by the sensor terminal, a communication connection with the management terminal and then transmitting the individual time, configuration information of the hardware of the sensor terminal, and a version of the software of the sensor terminal to the management terminal, associating, by the management terminal, the individual time received from each sensor terminal with the reference time at which the individual time was received and storing the associated times as a time pair, transmitting, by the sensor terminal, the sensing information and the information detection time to the management terminal after transmitting the individual time to the management terminal, determining, by the management terminal, a communication delay time between each sensor terminal and the management terminal using the configuration information of the hardware of the sensor terminal, the version of the software of the sensor terminal, the configuration information of the hardware of the management terminal, the version of the software of the management terminal, and a communication delay-causing combination table, the communication delay-causing combination table defining the communication delay time obtained by associating a combination of the configuration information of the hardware and the configuration information of the software of each sensor terminal with a combination of the configuration information of the hardware and the configuration information of the software of the management terminal, correcting, by the management terminal, the individual time of the time pair in accordance with the communication delay time and correcting a time correspondence map indicating a relationship between the individual time and the reference time using the corrected time pair, and correcting, by the management terminal, the information detection time received from each of the plurality of the sensor terminals based on the corrected time correspondence map.

A computer readable-medium stores a control program according to an exemplary aspect of the present disclosure. This control program is a program executed by a management terminal adapted to communicate with a plurality of sensor terminals, the management terminal being caused to execute the steps of:

establishing a communication connection between each of the plurality of the sensor terminals and the management terminal and then receiving an individual time held by the sensor terminal, configuration information of the hardware of the sensor terminal, and a version of the software of the sensor terminal from the sensor terminal, associating the individual time received from the sensor terminal with a reference time at which the individual time was received and storing the associated times as a time pair, receiving sensing information and an information detection time from the sensor terminal after receiving the individual time from the sensor terminal, the sensing information being related to a user and the information detection time being a time at which the sensing information was detected, determining a communication delay time between the sensor terminal and the management terminal using the received configuration information of the hardware of the sensor terminal, the received version of the software of the sensor terminal, configuration information of the hardware of the management terminal, version of the software of the management terminal, and a communication delay-causing combination table, the communication delay-causing combination table defining the communication delay time obtained by associating a combination of the configuration information of the hardware and the configuration information of the software of each sensor terminal with a combination of the configuration information of the hardware and the configuration information of the software of the management terminal, correcting the individual time of the time pair in accordance with the communication delay time and correcting a time correspondence map indicating a relationship between the individual time and the reference time using the corrected time pair, and correcting the information detection time received from each of the plurality of the sensor terminals based on the corrected time correspondence map.

According to the present disclosure, a communication system capable of reducing an influence of a communication delay, a control method, and a computer readable medium storing a control program can be provided.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 6 is a diagram showing an example of a table indicating combinations that cause communication delays;

DESCRIPTION OF EMBODIMENTS

Figure 1:
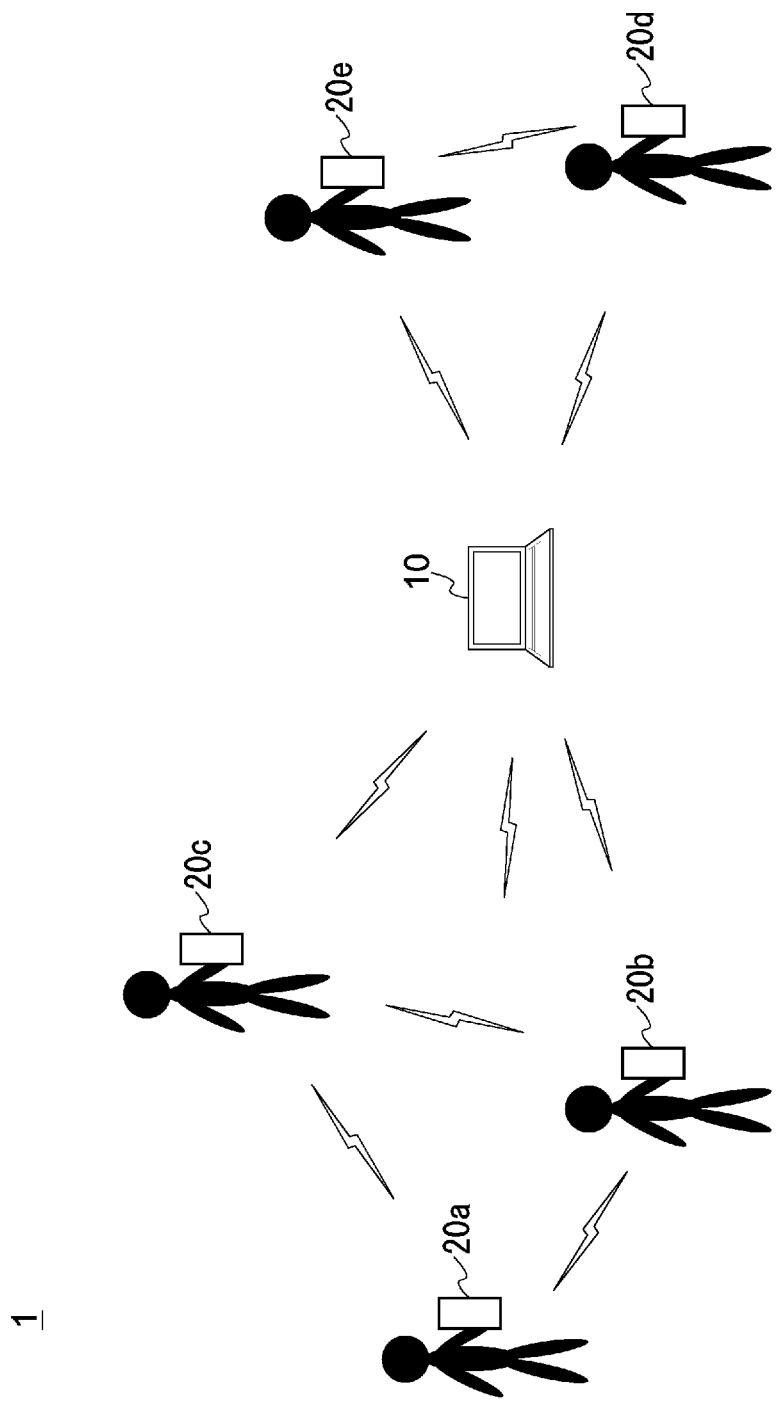
FIG. 1 is a schematic diagram showing a communication system according to a first embodiment of the present disclosure.

Hereinafter, embodiments of the present disclosure will be described. However, the embodiments are not intended to limit the scope of the present disclosure according to the claims. Further, not all of the components/structures described in the embodiments are necessarily indispensable as means for solving the problem. Note that the following description and the attached drawings are shortened and simplified where appropriate to clarify the explanation. In the drawings, the identical reference symbols denote identical structural elements and the redundant explanation thereof is omitted.

First Embodiment

FIG. 1 is a schematic diagram showing a communication system 1 according to a first embodiment. The communication system 1 is a system for analyzing a relationship among users of a plurality of sensor terminals. The communication system 1 includes a management terminal 10 and a plurality of sensor terminals 20a to 20e. The communication terminal 10 and the plurality of the sensor terminals 20a to 20e can perform data communication with one another by the radio communication conforming to the wireless communication standards such as the Bluetooth (registered trademark). Note that data communication may also be performed among the plurality of the sensor terminals 20a to 20e by the radio communication.

The management terminal 10 holds a reference time and is configured in such a manner as to be able to communicate with the plurality of the sensor terminals 20a to 20e. Specific examples of the management terminal 10 include various devices such as a PC having a radio communication function, a tablet type terminal device, a laptop PC, and a smartphone.

Each of the plurality of the sensor terminals 20a to 20e has a clock that indicates an individual time (hereinbelow referred to as an "individual time"). Further, each of the plurality of the sensor terminals 20a to 20e detects sensing information related to the user and an information detection time which is a time at which the sensing information was detected. Here, the sensing information includes, for instance, information of the ambient sound including the user's vocal utterance and sound pressure information of the ambient sound including the user's vocal utterance. Further, the sensing information may include information related to movement (a motion) of the user. The plurality of the sensor terminals 20a to 20e may start detection of the sensing information and the information detection time before establishing communication with the management terminal 10. Specific examples of the plurality of the sensor terminals 20a to 20e include various portable devices such as a wearable terminal device having a radio communication function, and the like. Note that only five sensor terminals 20a to 20e are shown in FIG. 1 for the sake of explanation, but any number of sensor terminals can be used. Note that in the explanation given below, when no particular one of the plurality of the sensor terminals 20a to 20e is being referred to, it is simply referred to as a sensor terminal 20.

Figure 2:
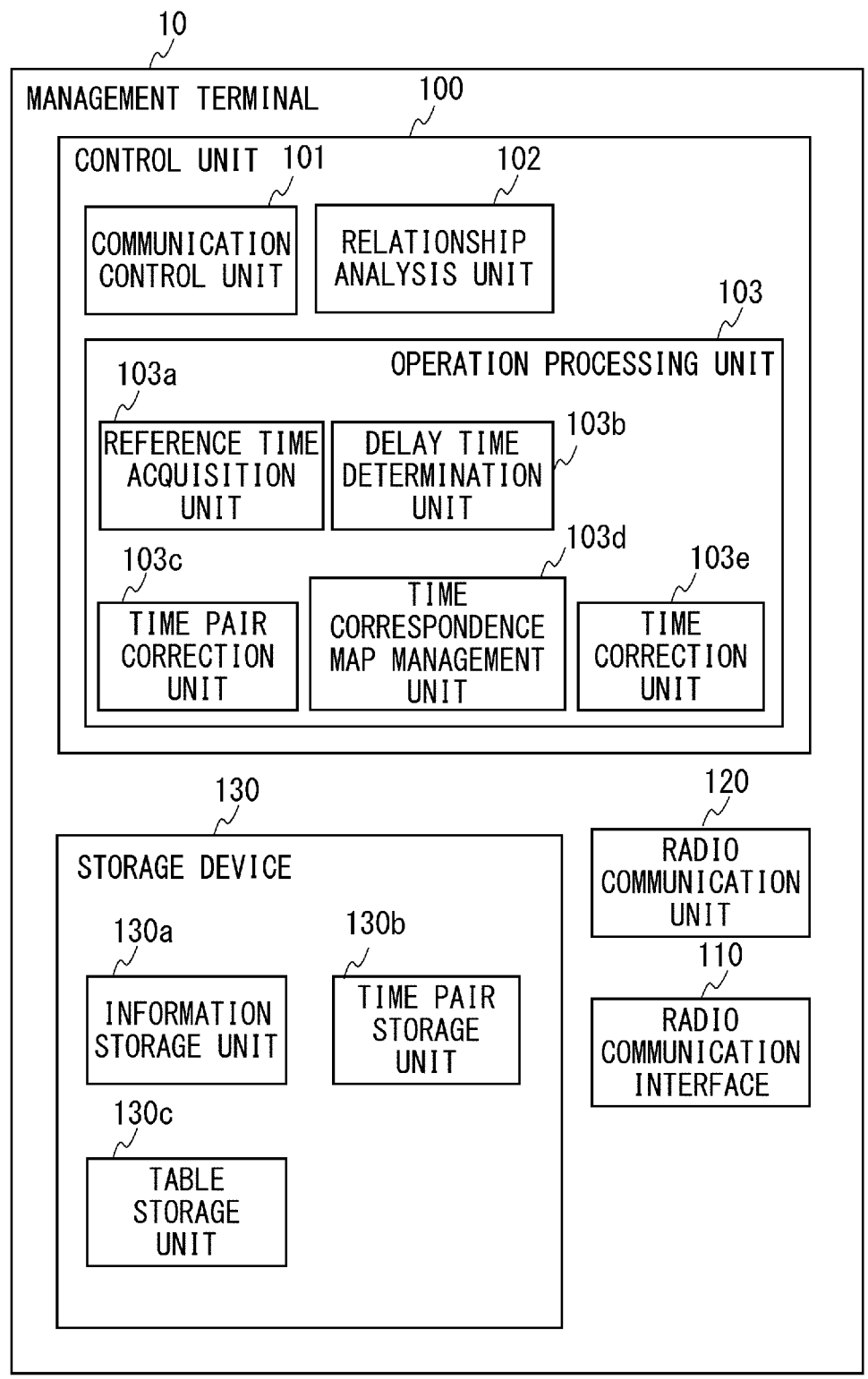
FIG. 2 is a block diagram showing a configuration of a management terminal of the communication system according to the first embodiment of the present disclosure.

FIG. 2 is a block diagram showing a detailed configuration of the management terminal 10 according to the first embodiment. The management terminal 10 includes a control unit 100, a radio communication interface 110, a radio communication unit 120, and a storage device 130.

The control unit 100 is a calculation device such as a central processing unit (CPU) for controlling the electronic circuits and the devices included in the management terminal 10. The control unit 100 executes various programs by developing them in a random access memory (RAM) (not shown). The control unit 100 includes a communication control unit 101, a relationship analysis unit 102, and an operation processing unit 103, all of which are program modules.

The communication control unit 101 is a program module for controlling the radio communication performed between the control terminal 10 and the plurality of the sensor terminals 20a to 20e. The communication control unit 101 establishes a radio communication between the control terminal 10 and the plurality of the sensor terminals 20a to 20e. Further, the communication control unit 101 receives the sensing information and the information detection time from each of the plurality of the sensor terminals 20a to 20e and stores the received sensing information and the received information detection time in the storage device 130.

The operation processing unit 103 includes a reference time acquisition unit 103a, a delay time determination unit 103b, a time pair correction unit 103c, a time correspondence map management unit 103d, and a time correction unit 103e. The reference time acquisition unit 103a holds the accurate time as the reference time. That is, the reference time acquisition unit 103a acquires the accurate time such as the standard time by, for instance, accessing the internet on a real time basis, and holds the acquired accurate time as the reference time.

The delay time determination unit 103b determines the communication delay time between each of the plurality of the sensor terminals 20a to 20e and the management terminal 10. Specifically, the delay time determination unit 103b determines the communication delay time between the sensor terminal 20 and the management terminal 10 using the configuration information of the hardware of the sensor terminal 20, the configuration information of the hardware of the management terminal 10, the version of the software of the sensor terminal 20, the version of the software of the management terminal 10, and a table indicating combinations that cause communication delays (hereinbelow referred to as a communication delay-causing combination table). Note that the communication delay-causing combination table will be described later. The time pair correction unit 103c corrects the individual time included in the time pair in accordance with the determined communication delay time.

The configuration information of the hardware of the sensor terminal 20 is, for instance, the version of the hardware of the sensor terminal 20. The configuration information of the hardware of the management terminal 10 is, for instance, the version of the hardware of the management terminal 10.

The time correspondence map management unit 103d creates and updates a time correspondence map of each of the plurality of the terminals 20a to 20e. Note that the creation and the updating of the time correspondence map will be described later. The time correction unit 103e corrects the information detection time received from each of the plurality of the sensor terminals 20a to 20e based on the time correspondence map of each of the plurality of the sensor terminals 20a to 20e.

The relationship analysis unit 102 analyzes the relationship among the users of the plurality of the sensor terminals 20a to 20e using the sensing information and the corrected information detection time of each of the plurality of the sensor terminals 20a to 20e. The relationship among the users is, for instance, the content of the vocal utterance of each of the users of the plurality of the sensor terminals 20a to 20e and the difference in how often each of the users makes the vocal utterance.

The radio communication interface 110 is an interface for controlling the radio data communication performed between the management terminal 10 and the plurality of the sensor terminals 20a to 20e. The radio communication interface 110 can perform the radio data communication using the radio waves in a bandwidth of 2.4 GHz or the like.

The radio communication unit 120 is an electronic circuit for transmitting and receiving data via the radio communication interface 110. The radio communication unit 120 includes a transmission/reception circuit. When the transmission/reception circuit receives various data from the plurality of the sensor terminals 20a to 20e via the radio communication interface 110, these data are provided to the control unit 100. The radio communication interface 110 and the radio communication unit 120 are configured as, for instance, communication modules.

The storage device 130 is a memory in which various data and programs are stored. The storage device 130 includes an information storage unit 130a, a time pair storage unit 130b, and a table storage unit 130c. The information storage unit 130a stores the sensing information and the information detection time received from each of the plurality of the sensor terminals 20a to 20e. The information detection time stored in the information storage unit 130a is updated by the information detection time corrected by the time correction unit 103e. The time pair storage unit 130b stores, for each of the plurality of the sensor terminals 20a to 20e, the time pair in which the individual time is associated with the reference time indicating the same instant as the individual time. The table storage unit 130c stores the communication delay-causing combination table.

Figure 3:
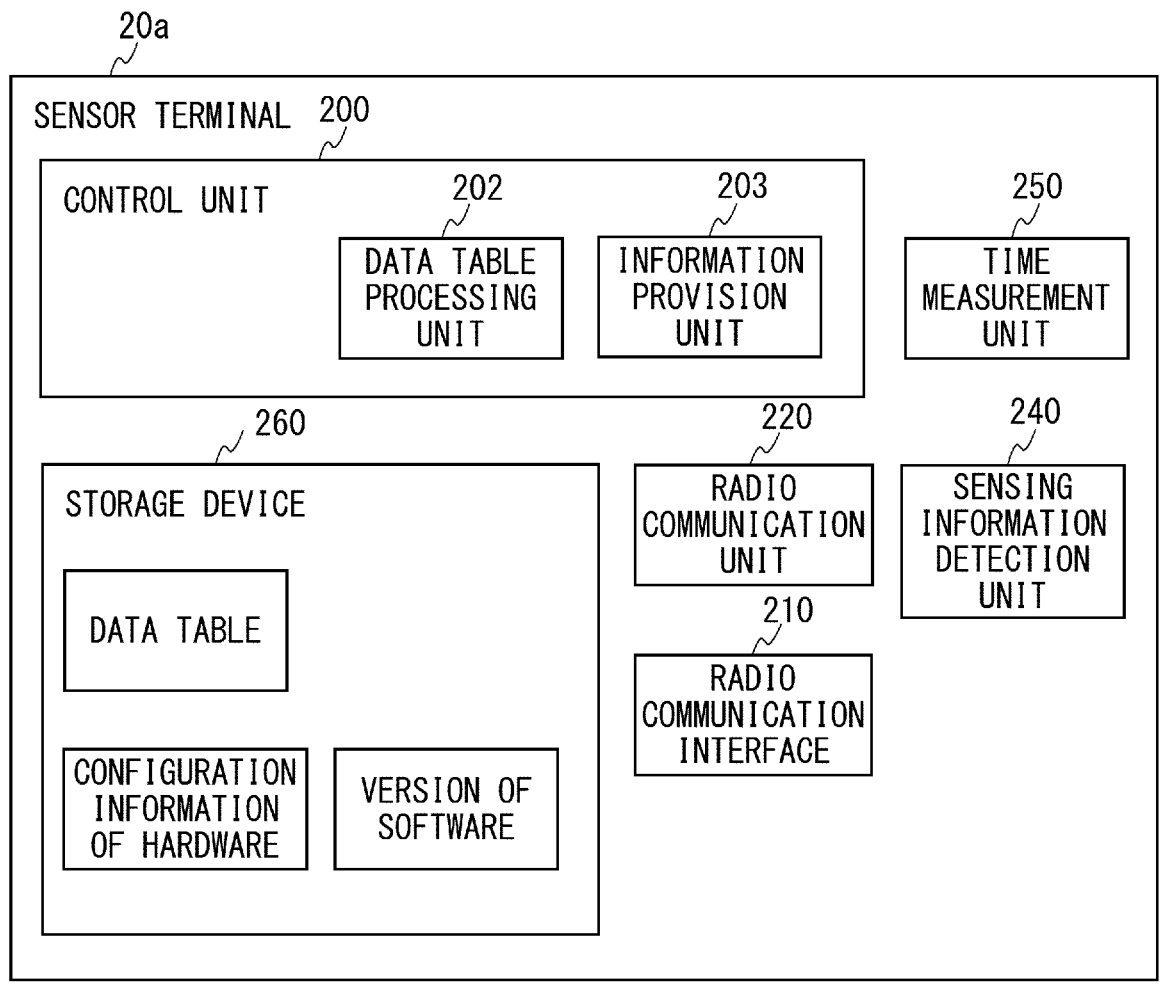
FIG. 3 is a block diagram showing a configuration of a sensor terminal of the communication system according to the first embodiment of the present disclosure.

FIG. 3 is a block diagram showing a configuration of the sensor terminal 20a. Hereinbelow, the configuration of the sensor terminal 20a is described with reference to FIG. 3. Note that since the configuration each of the sensor terminals 20b to 20e is the same as the configuration of the sensor terminal 20a, explanation thereof is omitted.

The sensor terminal 20a includes a control unit 200, a radio communication interface 210, a radio communication unit 220, a sensing information detection unit 240, a time measurement unit 250, and a storage device 260.

The control unit 200 is a calculation device such as a CPU for controlling the electronic circuits and the devices included in the sensor terminal 20a. The control unit 200 includes a data table processing unit 202 and an information provision unit 203.

The data table processing unit 202 is a program module for processing the data table created in the storage device 260. The data table processing unit 202 stores the sensing information and the information detection time at which the sensing information was detected in association with each other in the data table.

The data provision unit 203 is a program module for providing the individual time, the sensing information, and the information detection time to the management terminal 10 by the radio communication. Further, the information provision unit 203 provides the configuration information of the hardware of the sensor terminal 20a and the version of the software of the sensor terminal 20a to the management terminal 10. The information provision unit 203 transmits the configuration information of the hardware of the sensor terminal 20a and the version of the software of the sensor terminal 20a to the management terminal 10 on a regular basis.

The radio communication interface 210 is a device for controlling the radio data communication performed between the sensor terminal 20a and the management terminal 10. The radio communication interface 210 can perform the radio data communication using the radio waves in a bandwidth of 2.4 GHz or the like.

The radio communication unit 220 is an electronic circuit for transmitting and receiving data via the radio communication interface 210. The radio communication unit 220 can transmit various data to the management terminal 10 via the radio communication interface 210 under the control of the control unit 200. The radio communication interface 210 and the radio communication unit 220 are configured as, for instance, communication modules.

The sensing information detection unit 240 is a device for detecting the sensing information. When the sensing information is the information of the ambient sound including the user's vocal utterance and the sound pressure information of the ambient sound including the user's vocal utterance, a microphone can be employed for the sensing information detection unit 240. When the sensing information is the movement of the user, an acceleration sensor can be employed for the sensing information detection unit 240. The sensing information detection unit 240 provides the detected sensing information to the data table processing unit 202.

A time measurement unit 250 is an electronic circuit for measuring current time. The current time refers to an individual time of each the plurality of the sensor terminals 20a to 20e. The time measurement unit 250 provides the individual time in accordance with requests from the data table processing unit 202 and the information provision unit 203. The information provision unit 203 provides the individual time provided from the time measurement unit 250 to the management terminal 10.

The storage device 260 is a memory in which data such as the sensing information and the information detection time and various programs are stored. Further, the aforementioned data table is created in the storage device 260, and the configuration information of the hardware of the sensor terminals and the configuration information of the hardware of the management terminal and the version of the software of the sensor terminals and the version of the software of the management terminal are stored in the storage device 260.

Figure 4:
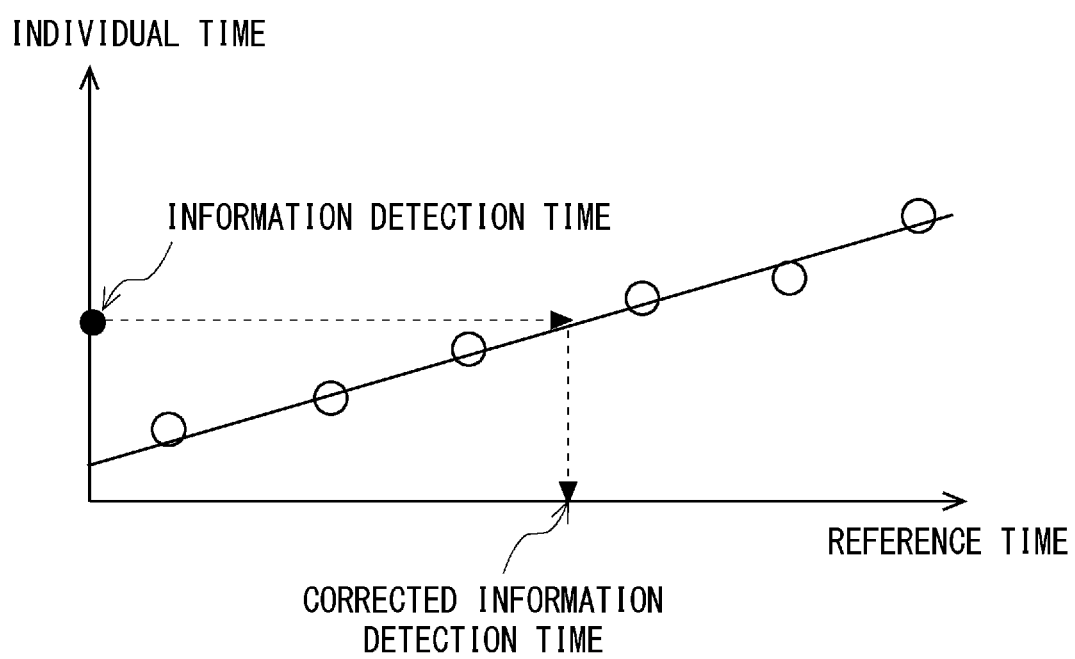
FIG. 4 is a schematic diagram showing an example of a time correspondence map of the sensor terminals.

Here, a method for creating a time correspondence map of each of the plurality of the sensor terminals 20a to 20e executed by the time correspondence map management unit 103d (see, FIG. 2) is described. Note that the method for creating a time correspondence map of each of the sensor terminals 20a to 20e is the same for each of these sensor terminals, and thus the method for creating a time correspondence map of only the sensor terminal 20a is described below as an example. FIG. 4 is a schematic diagram showing an example of a time correspondence map of the sensor terminal 20a. It is assumed that six time pairs of the individual time of the sensor terminal 20a and the reference time corresponding to the individual time are obtained. As shown in FIG. 4, these time pairs are plotted in a graph in which the horizontal axis represents the reference time and the vertical axis represents the individual time of the sensor terminal 20a. Then, a regression line having the least square error is obtained for the plotted points using the least squares method. This regression line forms the time correspondence map.

Figure 5:
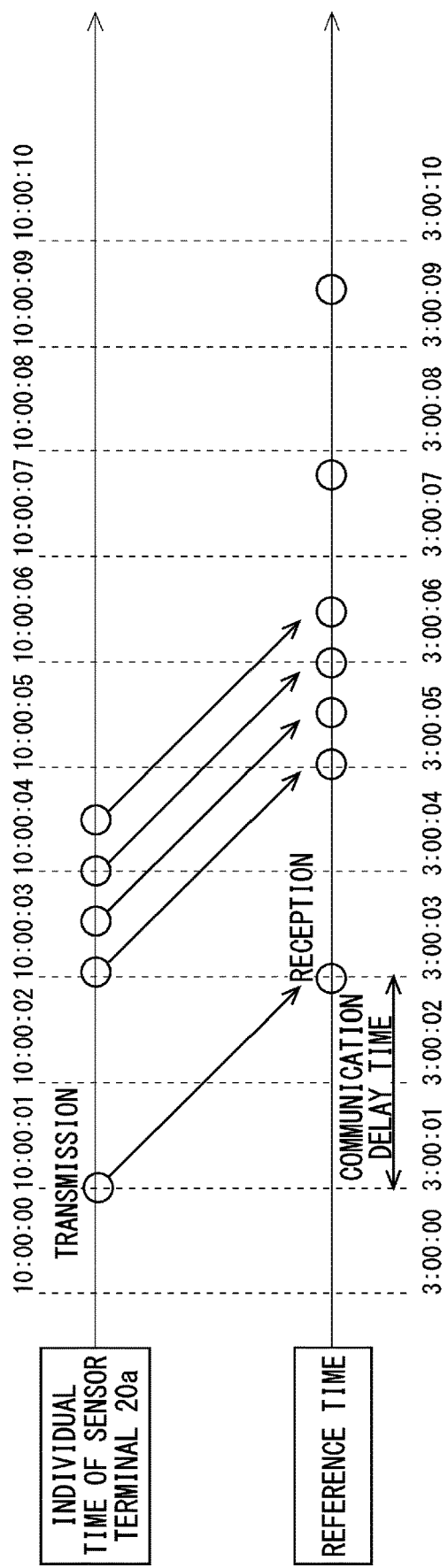
FIG. 5 is a schematic diagram describing a communication delay caused between a sensor terminal and a management terminal.

When the management terminal 10 receives the individual time from each of the plurality of the sensor terminals 20a to 20e, a communication delay always occur. FIG. 5 is a schematic diagram describing a communication delay caused between the sensor terminal 20 and the management terminal 10. In FIG. 5, the individual time of the sensor terminal 20 and the reference time indicating the same instant as the individual time (that is, the reference time corresponding to the individual time) are connected by a dashed line. Further, the individual time of the sensor terminal 20 and the reference time at which the management terminal 10 received the individual time from the sensor terminal 20 are connected by an arrow.

In the example shown in FIG. 5, it is assumed that the communication delay time caused in the communication performed between the sensor terminal 20 and the management terminal 10 is two seconds. As shown in FIG. 5, for instance, when it is assumed that the individual time of the sensor terminal 20 is 10:00:01, the reference time at which the management terminal 10 received the individual time (10:00:01) from the sensor terminal 20 is 3:00:03. The reference time (3:00:03) at which the management terminal 10 received the individual time (10:00:01) from the sensor terminal 20 is delayed from the reference time (3:00:01) indicating the same instant as the individual time (10:00:01) by the communication delay time. The reference time (3:00:01) indicating the same instant as the individual time (10:00:01) is the time that is earlier than the reference time (3:00:03) at which the management terminal 10 received the individual time (10:00:01) from the sensor terminal 20 by two seconds of the communication delay time.

As described above, the reference time corresponding to the individual time needs to be the time that is obtained by correcting the reference time at which the management terminal 10 received the individual time from the sensor terminal 20 taking into consideration the communication delay time. That is, in the time correction unit 103e (see, FIG. 2), the reference time at which the management terminal 10 received the individual time from the sensor terminal 20 is corrected in accordance with the communication delay time, and the corrected reference time is set to be the reference time corresponding to the individual time.

When there are a plurality of combinations of the hardware and the software as regards each of the plurality of the sensor terminals 20a to 20e and the management terminal 10, the communication delay times vary depending on the combinations. FIG. 6 is a diagram showing an example of the communication delay-causing combination table. As shown in FIG. 6, the communication delay-causing combination table is a data table in which the combination of the configuration information of the hardware of the sensor terminal 20 and the version of the software of the sensor terminal 20, the combination of the configuration information of the hardware of the management terminal 10 and the version of the software of the management terminal 10, and the delay time corresponding to each combination are defined. For instance, it is assumed that the configuration information (the version) of the hardware of the sensor terminal 20 and the version of the software of the sensor terminal 20 are "1.0.0" and "1.0.0", respectively, and the configuration information (the version) of the hardware of the management terminal 10 and the version of the software of the management terminal 10 are "2.0.0" and "2.0.1", respectively. In this case, the communication delay time is 60 [ms]. Each of the sensor terminals 20a to 20e has one of the combinations of the configuration information of the hardware and the version of the software defined in the communication delay-causing combination table.

Note that the configuration information of the hardware of the sensor terminal 20 may be information related to the specifications of the structural components of the sensor terminal 20, and the configuration information of the hardware of the management terminal 10 may also be information related to the specifications of the structural components of the management terminal 10. When the plurality of the sensor terminals 20a to 20e manufactured by only one manufacturer and the management terminal 10 are used, the configuration information of the hardware of the plurality of the sensor terminals 20a to 20e and the configuration information of the hardware of the management terminal 10 can be defined by the versions of the hardware. However, when the plurality of sensor terminals 20a to 20e manufactured by a plurality of manufacturers and the management terminal 10 are used, it is difficult to define the configuration information of the hardware of the plurality of the sensor terminals 20a to 20e and the configuration information of the hardware of the management terminal 10 based on the versions of the hardware. By setting the configuration information of the hardware of sensor terminals 20a to 20e and the configuration information of the hardware of the management terminal 10 to be information related to the specifications of the structural components of the sensor terminals and the specifications of the structural components of the management terminal, respectively, the configuration information of the hardware of the plurality of the sensor terminals 20a to 20e and the configuration information of the hardware of the management terminal 10 can be easily defined even when the plurality of the sensor terminals 20a to 20e manufactured by the plurality of manufacturers and the management terminal 10 are used.

Note that among the structural components of the sensor terminal 20 and the management terminal 10, those that affect the communication delays include, for instance, a CPU, a memory, and a communication module. Therefore, the information related to the specifications of the structural components may include the information related to the specification of at least one of the CPU, the memory, and the communication module.

Figure 7:
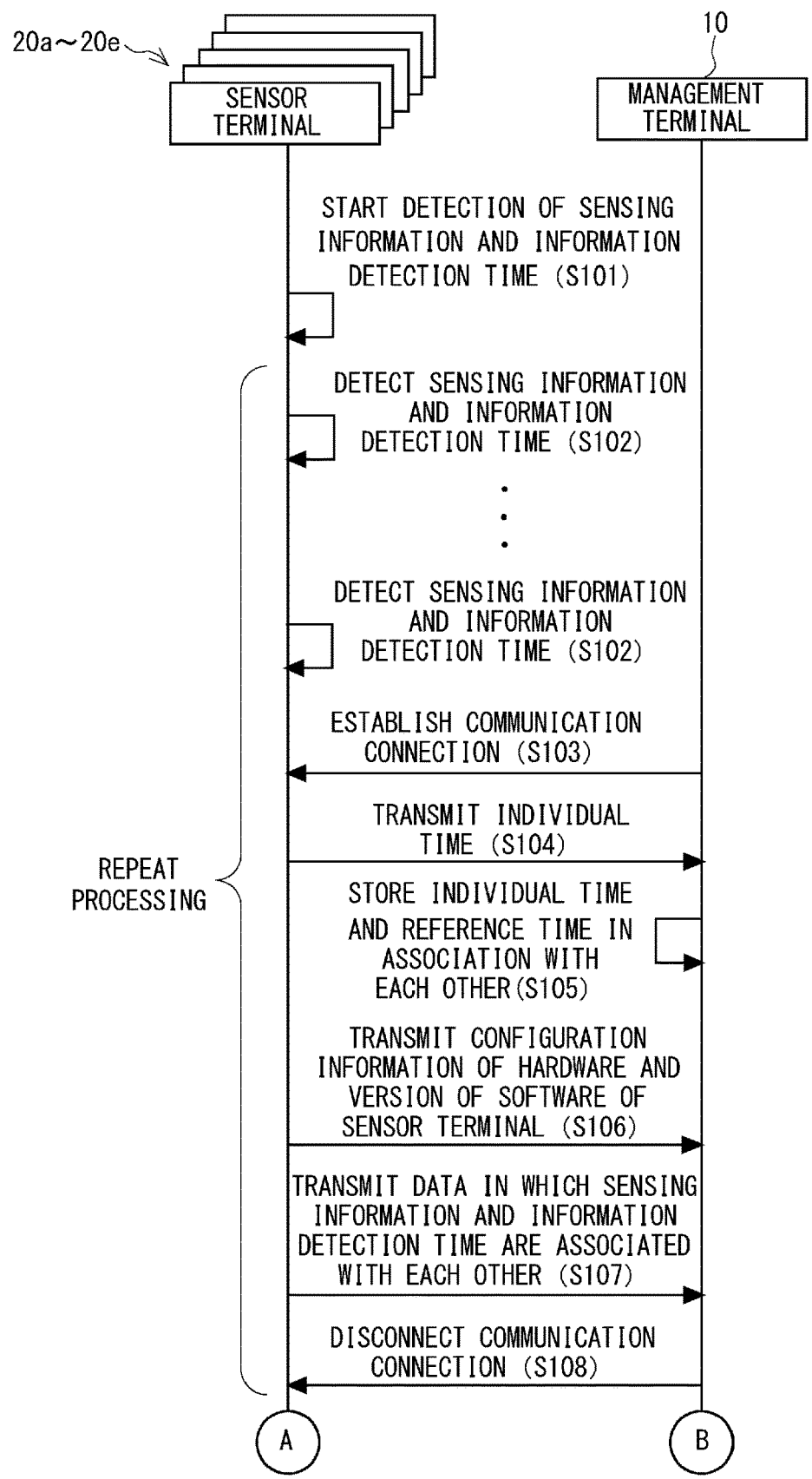
FIG. 7 is a sequence chart showing a flow of processing for correcting an information detection time of each of a plurality of sensor terminals in the communication system according to the first embodiment of the present disclosure.
Figure 8:
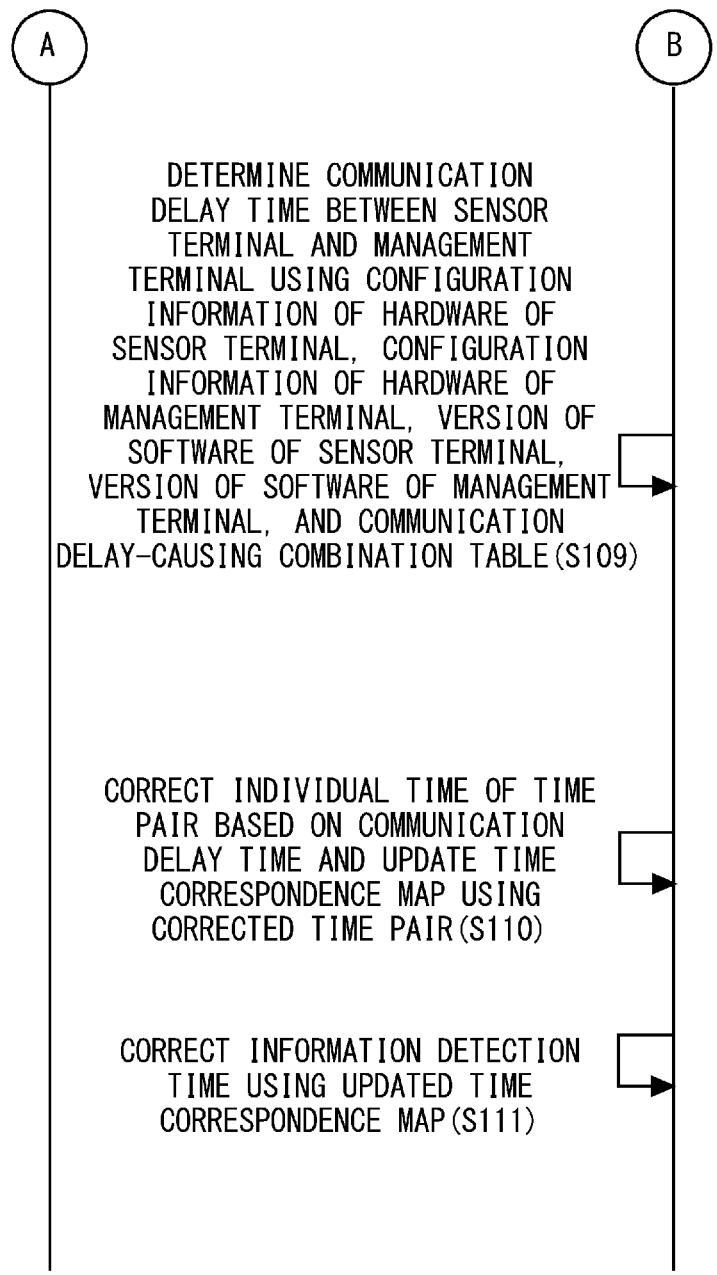
FIG. 8 is the sequence chart showing the flow of processing for correcting the information detection time of each of the plurality of the sensor terminals in the communication system according to the first embodiment of the present disclosure.

Next, a flow of processing for correcting the information detection time of each of the plurality of the sensor terminals 20a to 20e is described. FIGS. 7 and 8 show a sequence chart showing a flow of processing for correcting the information detection time of each of the plurality of the sensor terminals 20a to 20e. As shown in FIG. 7, when a power switch is turned on, each of the plurality of the sensor terminals 20a to 20e starts detection of the sensing information and the information detection time (Step S101). Then, each of the plurality of the sensor terminals 20a to 20e detects the sensing information and the information detection time (Step S102). Note that after starting the detection of the sensing information, each of the plurality of the sensor terminals 20a to 20e detects the sensing information on a regular basis.

Following Step S102, the management terminal 10 establishes a communication connection with the plurality of the sensor terminals 20a to 20e (Step S103). Next, each of the plurality of the sensor terminals 20a to 20e transmits the individual time to the management terminal 10 (Step S104). Then, the management terminal 10 associates the individual time received from the sensor terminal 20 with the reference time at which the management terminal 10 received the individual time, and stores the associated times as a time pair (Step S105). Next, each of the plurality of the sensor terminals 20a to 20e transmits the configuration information of its hardware and the version of its software to the management terminal 10 (Step S106). Next, each of the plurality of the sensor terminals 20a to 20e transmits data (a data table) in which the sensing information and the information detection time are associated with each other to the management terminal 10 (Step S107). Then, the management terminal 10 disconnects the communication connection established between the management terminal 10 and the plurality of the sensor terminals 20a to 20e (Step S108). Note that the processing performed in Step S102 through to Step S108 may be performed on a periodic basis.

Next, as shown in FIG. 8, the management terminal 10 determines the communication delay time between each of the plurality of the sensor terminals 20a to 20e and the management terminal 10 using the configuration information of the hardware of each sensor terminal 20, the configuration information of the hardware of the management terminal 10, the version of the software of each sensor terminal 20, the version of the software of the management terminal 10, and the communication delay-causing combination table (Step S109). Then, the management terminal 10 corrects the individual time of the time pair based on the determined communication delay time and updates the time correspondence map using the corrected time pair (Step S110). Next, the management terminal 10 corrects the information detection time of each of the plurality of the sensor terminals 20a to 20e using the updated time correspondence map of each of the plurality of the sensor terminals 20a to 20e (Step S111).

Note that in Step S104, when the intensity of the radio waves emitted from each sensor terminal 20 at the time when the management terminal 10 receives the individual time is below the prescribed threshold value, it is highly likely that the management terminal 10 cannot receive the individual time by the first transmission and the pertinent sensor terminal 20 tries to re-transmit the individual time several times, and then finally, the management terminal 10 can receive the individual time. The greater the number of re-transmission performed, the longer the communication delay time becomes compared to the communication delay time when the management terminal 10 receives the individual time in the first transmission. That is, when the intensity of the radio waves emitted from each sensor terminal 20 is below the prescribed threshold value, it is highly likely that the actual communication delay time deviates from the communication delay time determined in Step S109. Thus, when the intensity of the radio waves emitted from each sensor terminal 20 at the time when the management terminal 10 receives the individual time is below the prescribed threshold value, the management terminal 10 discards the received individual time.

As described above, communication delay occurs when the management terminal 10 receives the individual time from each sensor terminal 20. Therefore, the reference time at which the management terminal 10 received the individual time from each sensor terminal 20 is delayed from the reference time indicating the same instant as the individual time by the communication delay time. Therefore, the reference time corresponding to the individual time needs to be the time that is obtained by correcting the reference time at which the management terminal 10 received the individual time from the sensor terminal 20 taking into consideration the communication delay time. However, the communication delay time varies depending on the combination of the configuration information of the hardware of the sensor terminal 20, the version of the software of the sensor terminal 20, the configuration information of the hardware of the management terminal 10, and the version of the software of the management terminal 10. In the communication system 1 according to the first embodiment, the communication delay time is determined in accordance with the combination described above and the time correspondence map indicating the relationship between the individual time and the reference time is corrected using the communication delay time. Then, the information detection time received from each of the plurality of the sensor terminals 20 is corrected based on the time correspondence map. By this configuration, the influence of the communication delays can be reduced.

Second Embodiment

Figure 9:
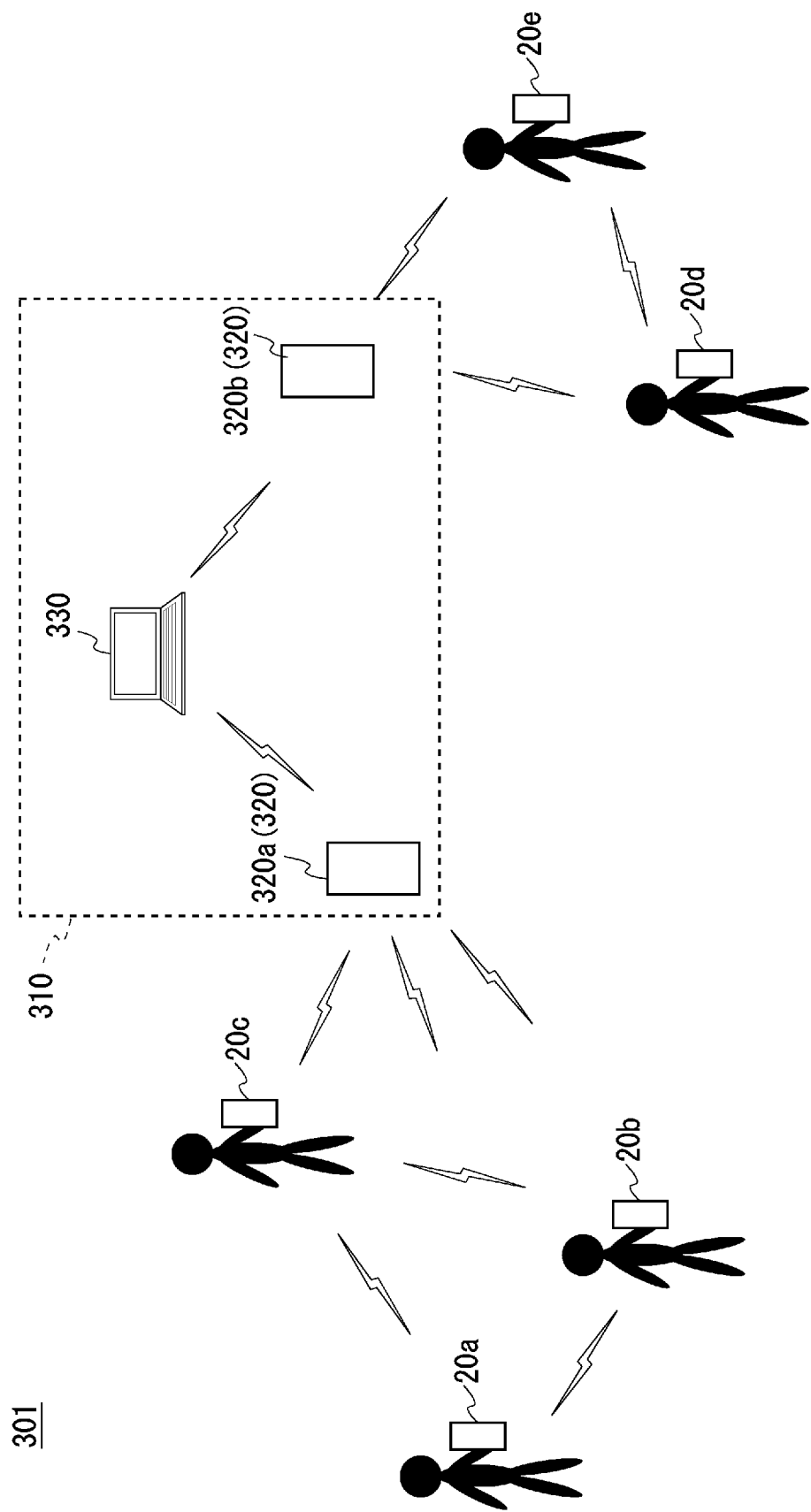
FIG. 9 is a schematic diagram showing a communication system according to a second embodiment of the present disclosure.

FIG. 9 is a schematic diagram showing a communication system 301 according to a second embodiment. The communication system 301 includes a management terminal 310 and the plurality of the sensor terminals 20a to 20e. The difference from the communication system 1 according to the first embodiment is that the management terminal 310 is separated into a relay device 320 and a data server 330. By taking this configuration, the relay device 320 for receiving data from each of the plurality of the sensor terminals 20a to 20e can be disposed in a plural number.

The relay device 320 and the plurality of the sensor terminals 20a to 20e can perform data communication with one another by the radio communication conforming to the wireless communication standards such as the Bluetooth (registered trademark). The relay device 320 includes a plurality of relay devices 320a and 320b. Note that only two relay devices 320a and 320b are shown in FIG. 9 for the sake of explanation, and any number of relay devices can be used. For instance, when a group of the plurality of the sensor terminals 20a to 20c and a group of the plurality of the sensor terminals 20d to 20e are apart from each other, the relay device 320a performs radio communication with the plurality of the sensor terminals 20a to 20c and the relay device 320b performs radio communication with the plurality of the sensor terminals 20d to 20e. The data server 330 and the relay device 320 can perform data communication with each other by the radio communications described above. Further, the plurality of the sensor terminals 20a to 20e can perform data communication with each other by the radio communications described above.

The data server 330 is a device for processing information provided from the plurality of the sensor terminals 20a to 20e. Specific examples of the data server 330 include various devices such as a PC having a radio communication function, a tablet type terminal device, a laptop PC, and a smartphone. Further, the data server 330 may be, for instance, a cloud server.

Figure 10:
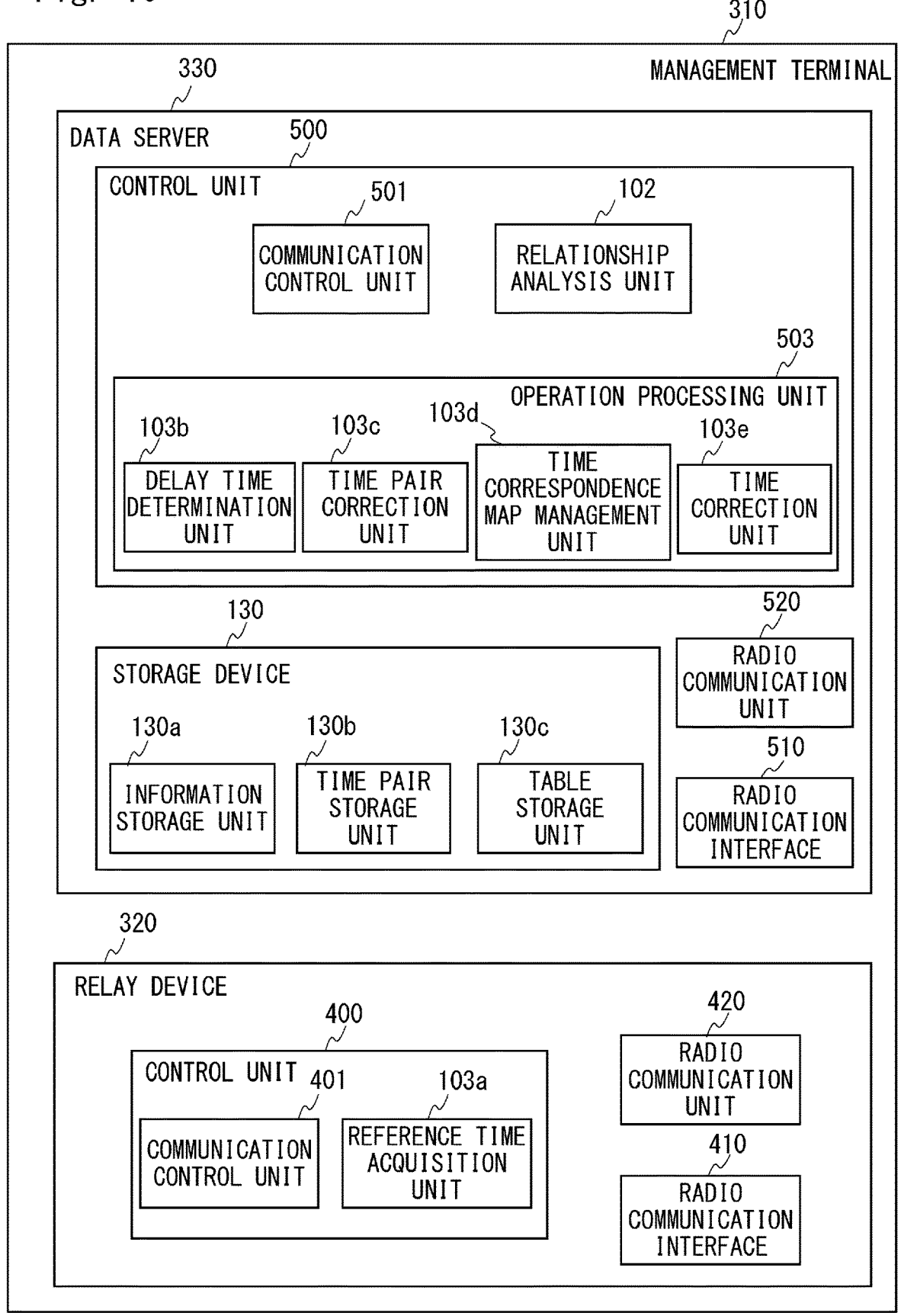
FIG. 10 is a block diagram showing a configuration of a management terminal of the communication system according to the second embodiment of the present disclosure.

FIG. 10 is a block diagram showing a detailed configuration of the management terminal 310. The management terminal 310 includes the relay device 320 and the data server 330.

The relay device 320 is a device for transferring data from the plurality of the sensor terminals 20a to 20e to the data server 330. The relay device 320 includes a control unit 400, a radio communication interface 410, and a radio communication unit 420.

The control unit 400 executes various programs by developing them in a random access memory (RAM) (not shown). The control unit 400 includes a communication control unit 401 and a reference time acquisition unit 103a, both of which are program modules. The communication control unit 401 is a program module for controlling the radio communication performed between the relay device 320 and the plurality of the sensor terminals 20a to 20e, and the radio communication performed between the relay device 320 and the data server 330. The communication control unit 401 establishes radio a communication between the relay device 320 and the plurality of the sensor terminals 20a to 20e, and establishes a radio communication between the relay device 320 and the data server 330.

The radio communication interface 410 is an interface for controlling the radio data communication performed between the relay device 320 and the plurality of the sensor terminals 20a to 20e and the radio data communication performed between the relay device 320 and the data server 330. The radio communication interface 410 can perform the radio data communication using the radio waves in a bandwidth of 2.4 GHz or the like.

The radio communication unit 420 is an electronic circuit for transmitting and receiving data via the radio communication interface 410. The radio communication unit 420 includes a transmission/reception circuit. When the transmission/reception circuit receives various data from the plurality of the sensor terminals 20a to 20e via the radio communication interface 410, these data are provided to the control unit 400. Further, the transmission/reception circuit transmit various data to the data server 330 via the radio communication interface 410 under the control of the control unit 400.

The data server 330 includes a control unit 500, a radio communication interface 510, a radio communication unit 520, and the storage device 130.

The control unit 500 is a calculation device such as a CPU for controlling the electronic circuits and the devices included in the data server 330. The control unit 500 executes various programs by developing them in a random access memory (RAM) (not shown). The control unit 500 includes a communication control unit 501, the relationship analysis unit 102, and an operation processing unit 503, all of which are program modules.

The communication control unit 501 is a program module for controlling the radio communication performed between the data server 330 and the relay device 320. The communication control unit 501 establishes a radio communication between the data server 330 and the relay device 320.

Further, the communication control unit 501 receives the sensing information and the information detection time from each of the plurality of the sensor terminals 20a to 20e via the relay device 320 and stores the sensing information and the information detection time received from each of the plurality of the sensor terminals 20a to 20e in the storage device 130. The operation processing unit 503 includes the delay time determination unit 103b, the time pair correction unit 103c, the time correspondence map management unit 103d, and the time correction unit 103e.

The delay time determination unit 103b of the management terminal 310 is the same as the delay time determination unit 103b of the management terminal 10 in the communication system 1 according to the first embodiment. That is, the delay time determination unit 103b determines the communication delay time between any sensor terminal 20 and the management terminal 310 using the configuration information of the hardware of the instant sensor terminal 20, the configuration information of the hardware of the management terminal 310, the version of the software of the instant sensor terminal 20, the version of the software of the management terminal 310, and the communication delay-causing combination table. Here, the communication delay time refers to a communication delay time between the sensor terminal 20 and the relay device 320.

The configuration information of the hardware of the sensor terminal 20 may be the version of the hardware of the sensor terminal 20, or may be information related to the specifications of the structural components of the sensor terminal 20. Further, the configuration information of the hardware of the management terminal 310 may be the version of the hardware of the relay device 320, or may be information related to the specifications of the structural components of the relay device 320. The information related to the specifications of the structural components may include the information related to the specification of at least one of the CPU, the memory, and the communication module.

The radio communication interface 510 is an interface for controlling the radio data communication performed between the data server 330 and the relay device 320. The radio communication interface 510 can perform the radio data communication using the radio waves in a bandwidth of 2.4 GHz or the like.

The radio communication unit 520 is an electronic circuit for transmitting and receiving data via the radio communication interface 510. The radio communication unit 120 includes a transmission/reception circuit. When the transmission/reception circuit receives various data from the relay device 320 via the radio communication interface 510, these data are provided to the control unit 500.

Figure 11:
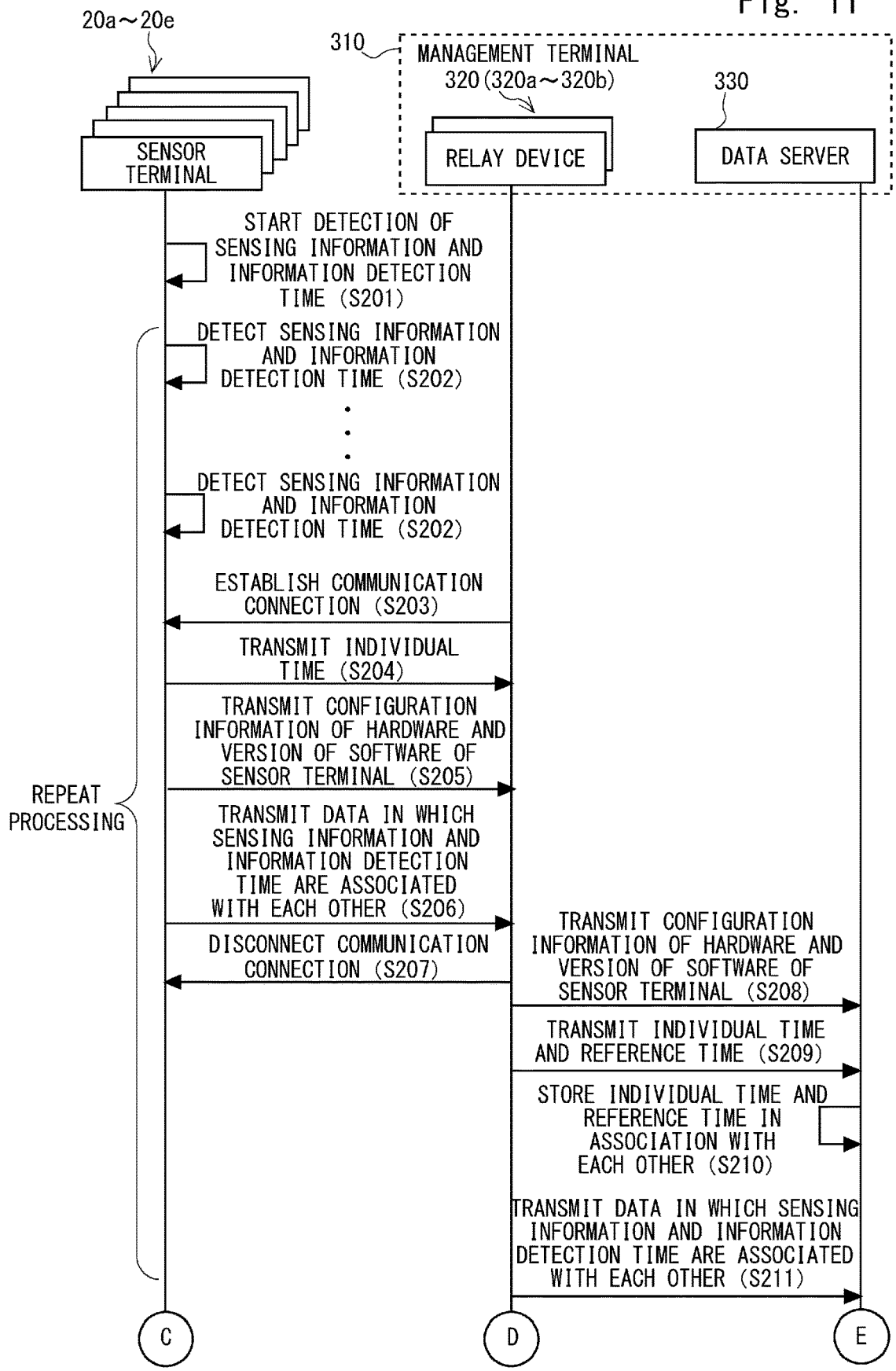
FIG. 11 is a sequence chart showing a flow of processing for correcting an information detection time of each of a plurality of sensor terminals in the second embodiment of the present disclosure.

Next, a flow of processing for correcting the information detection time of each of the plurality of the sensor terminals 20a to 20e is described. FIG. 11 is a sequence chart showing a flow of processing for correcting the information detection time of each of the plurality of sensor terminals 20a to 20e. As shown in FIG. 11, when a power switch is turned on, each of the plurality of the sensor terminals 20a to 20e starts detection of the sensing information and the information detection time (Step S201). Then, each of the plurality of the sensor terminals 20a to 20e detects the sensing information and the information detection time (Step S202). Note that after starting the detection of the sensing information, each of the plurality of the sensor terminals 20a to 20e detects the sensing information on a regular basis.

Following Step S202, the relay device 320 (320a, 320b) establishes a communication connection with the plurality of the sensor terminals 20a to 20e (Step S203). Next, each of the plurality of the sensor terminals 20a to 20e transmits the individual time to the relay device 320 (320a, 320b) (Step S204). Then, each of the plurality of the sensor terminals 20a to 20e transmits the configuration information of its hardware and the version of its software to the relay device 320 (320a, 320b) (Step S205). Next, each of the plurality of the sensor terminals 20a to 20e transmits data (a data table) in which the sensing information and the information detection time are associated with each other to the relay device 320 (320a, 320b) (Step S206). Then, the relay device 320 (320a, 320b) disconnects the communication connection established with the plurality of the sensor terminals 20a to 20e (Step S207).

Following Step S207, the relay device 320 (320a, 320b) transmits the configuration information of the hardware of the sensor terminals 20a to 20e and the version of the software of the sensor terminals 20a to 20e to the data server 330 (Step S208). Next, the relay device 320 (320a, 320b) transmits the individual time and the reference time of each of the plurality of the sensor terminal 20a to 20e to the data server 330 (Step S209). Then, the data server 330 associates the individual time received from the sensor terminal 20 with the reference time at which the data server 330 received the individual time, and stores the associated times as a time pair (Step S210). Next, the relay device 320 (320a, 320b) transmits data (a data table) in which the sensing information and the information detection time are associated with each other to the data server 330 (Step S211). Note that the processing performed in Step S202 through to Step S211 may be performed repeatedly.

Figure 12:
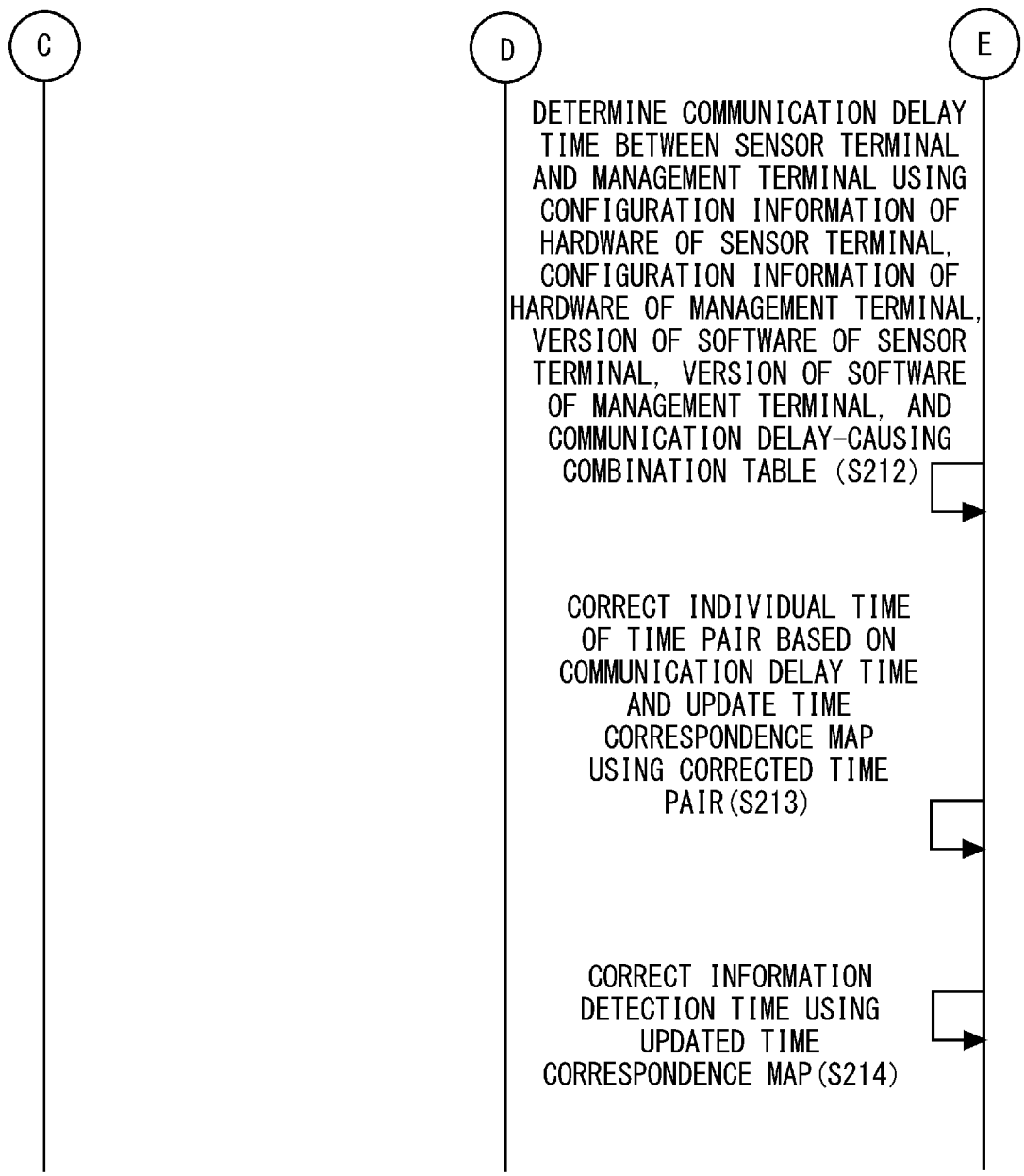
FIG. 12 is the sequence chart showing the flow of processing for correcting the information detection time of each of the plurality of the sensor terminals in the second embodiment of the present disclosure.

Next, as shown in FIG. 12, the data server 330 determines the communication delay time between each of the plurality of the sensor terminals 20a to 20e and the management terminal 310 (the relay device 320) using the configuration information of the hardware of each sensor terminal 20, the configuration information of the hardware of the management terminal 310 (the relay device 320), the version of the software of each sensor terminal 20, the version of the software of the management terminal 310 (the relay device 320), and the communication delay-causing combination table (Step S212). Then, the data server 330 corrects the individual time of the time pair based on the determined communication delay time and corrects (updates) the time correspondence map using the corrected time pair (Step S213). Next, the data server 330 corrects the information detection time of each of the plurality of the sensor terminals 20a to 20e using the updated time correspondence map of each of the plurality of the sensor terminals 20a to 20e (Step S214).

As described above, by separating the management terminal 310 into the relay device 320 and the data server 330, the relay device 320 can be disposed at several positions, whereby the sensor terminal 20 can acquire data over a wide range.

In the aforementioned examples, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways.

For instance, in the communication systems according to the aforementioned embodiments, the management terminal was described to include a relationship analysis unit. However, the relationship analysis unit may be included in a device different from the management device in the communication systems. Further, the several examples described above can be implemented in combination.

Such variations are not to be regarded as a departure from the spirit and scope of the disclosure, and all such modifications as would be obvious to one skilled in the art are intended for inclusion within the scope of the following claims.

What is claimed is:

1. A communication system comprising:
   a plurality of sensor terminals each having a clock that indicates an individual time and configured to detect sensing information and an information detection time, the sensing information being related to a user and the information detection time being a time at which the sensing information was detected; and
   a management terminal configured to have a reference time and adapted to communicate with the plurality of the senor terminals,
   wherein each of the plurality of the sensor terminals
      establishes a communication connection with the management terminal and then transmits the individual time, configuration information of the hardware of the sensor terminal, and a version of the software of the sensor terminal to the management terminal, and
      transmits the sensing information and the information detection time to the management terminal after transmitting the individual time to the management terminal,
   wherein the management terminal
      associates the individual time received from each sensor terminal with the reference time at which the individual time was received and stores the associated times as a time pair,
      determines a communication delay time between each sensor terminal and the management terminal using the configuration information of the hardware of the sensor terminal, the version of the software of the sensor terminal, configuration information of the hardware of the management terminal, version of the software of the management terminal, and a communication delay-causing combination table, the communication delay-causing combination table indicating a communication delay time obtained by associating a combination of the configuration information of the hardware and the version of the software of each sensor terminal with a combination of the configuration information of the hardware and the version of the software of the management terminal,
      corrects the individual time of the time pair in accordance with the communication delay time and corrects a time correspondence map indicating a relationship between the individual time and the reference time using the corrected time pair, and
      corrects the information detection time received from each of the plurality of the sensor terminals based on the corrected time correspondence map.

2. The communication system according to claim 1, wherein
   the configuration information of the hardware of the sensor terminal is information related to specifications of structural components of the sensor terminal, and
   the configuration information of the hardware of the management terminal is information related to specifications of structural components of the management terminal.

3. The communication system according to claim 2, wherein the information related to the specifications of the structural components include information related to a specification of at least one of a CPU, a memory, and a communication module.

4. The communication system according to claim 1, wherein when an intensity of radio waves emitted from the sensor terminal at the time when the management terminal received the individual time is below a prescribed threshold value, the management terminal discards the received individual time.

5. A control method for a communication system that comprises:
   a plurality of sensor terminals each having a clock that indicates an individual time and configured to detect sensing information and an information detection time, the sensing information being related to a user and the information detection time being a time at which the sensing information was detected; and
   a management terminal configured to have a reference time and adapted to communicate with the plurality of the sensor terminals,
   the method comprising:
   establishing, by the sensor terminal, a communication connection with the management terminal and then transmitting the individual time, configuration information of the hardware of the sensor terminal, and a version of the software of the sensor terminal to the management terminal,
   associating, by the management terminal, the individual time received from each sensor terminal with the reference time at which the individual time was received and storing the associated times as a time pair,
   transmitting, by the sensor terminal, the sensing information and the information detection time to the management terminal after transmitting the individual time to the management terminal,
   determining, by the management terminal, a communication delay time between each sensor terminal and the management terminal using the configuration information of the hardware of the sensor terminal, the version of the software of the sensor terminal, configuration information of the hardware of the management terminal, a version of the software of the management terminal, and a communication delay-causing combination table, the communication delay-causing combination table defining the communication delay time obtained by associating a combination of the configuration information of the hardware and the version of the software of each sensor terminal with a combination of the configuration information of the hardware and the version of the software of the management terminal, correcting, by the management terminal, the individual time of the time pair in accordance with the communication delay time and correcting a time correspondence map indicating a relationship between the individual time and the reference time using the corrected time pair, and correcting, by the management terminal, the information detection time received from each of the plurality of the sensor terminals based on the corrected time correspondence map.

6. A non-transitory computer readable-medium storing a control program executed by a management terminal adapted to communicate with a plurality of sensor terminals, the management terminal being caused to execute the steps of:

establishing a communication connection between each of the plurality of the sensor terminals and the management terminal and then receiving an individual time held by the sensor terminal, configuration information of the hardware of the sensor terminal, and a version of the software of the sensor terminal from the sensor terminal, associating the individual time received from the sensor terminal with a reference time at which the individual time was received and storing the associated times as a time pair, receiving sensing information and an information detection time from the sensor terminal after receiving the individual time from the sensor terminal, the sensing information being related to a user and the information detection time being a time at which the sensing information was detected, determining a communication delay time between the sensor terminal and the management terminal using the received configuration information of the hardware of the sensor terminal, the received version of the software of the sensor terminal, configuration information of the hardware of the management terminal, version of the software of the management terminal, and a communication delay-causing combination table, the communication delay-causing combination table defining the communication delay time obtained by associating a combination of the configuration information of the hardware and the version of the software of each sensor terminal with a combination of the configuration information of the hardware and the version of the software of the management terminal, correcting the individual time of the time pair in accordance with the communication delay time and correcting a time correspondence map indicating a relationship between the individual time and the reference time using the corrected time pair, and correcting the information detection time received from each of the plurality of the sensor terminals based on the corrected time correspondence map.

* * * * *